(12) United States Patent
Gupta et al.

(10) Patent No.: US 12,033,326 B2
(45) Date of Patent: Jul. 9, 2024

(54) SYSTEM AND METHOD FOR ANIMAL DISEASE MANAGEMENT

(71) Applicant: MYANIML, Overland Park, KS (US)

(72) Inventors: Shekhar Gupta, Overland Park, KS (US); Saroj Gupta, Overland Park, KS (US)

(73) Assignee: MYANIML, Overland Park, KS (US)

( * ) Notice: Subject to any disclaimer, the term of this patent is extended or adjusted under 35 U.S.C. 154(b) by 396 days.

(21) Appl. No.: 17/496,843

(22) Filed: Oct. 8, 2021

(65) Prior Publication Data

US 2023/0111876 A1  Apr. 13, 2023

(51) Int. Cl.
| | |
|---|---|
| *G06T 7/00* | (2017.01) |
| *A01K 29/00* | (2006.01) |
| *G06F 18/214* | (2023.01) |
| *G06T 7/11* | (2017.01) |
| *G06V 10/40* | (2022.01) |
| *G06V 40/10* | (2022.01) |

(52) U.S. Cl.
CPC ............ *G06T 7/0016* (2013.01); *A01K 29/00* (2013.01); *G06F 18/214* (2023.01); *G06T 7/11* (2017.01); *G06V 10/40* (2022.01); *G06V 40/10* (2022.01); *G06T 2207/10016* (2013.01); *G06T 2207/10048* (2013.01); *G06T 2207/20081* (2013.01); *G06T 2207/20132* (2013.01)

(58) Field of Classification Search
CPC ..................... G06T 7/0016; G06T 7/11; G06T 2207/10016; G06T 2207/10048; G06T 2207/20081; G06T 2207/20132; A01K 29/00; G06F 18/214; G06V 10/40; G06V 40/10; G06V 10/82
See application file for complete search history.

(56) References Cited

U.S. PATENT DOCUMENTS

2019/0080456 A1* 3/2019 Song ..................... G06T 7/174
2019/0385332 A1  12/2019 Yajima et al.

FOREIGN PATENT DOCUMENTS

| CN | 109255297 A | 1/2019 |
|---|---|---|
| CN | 111062929 A | 4/2020 |

(Continued)

OTHER PUBLICATIONS

Digital Livestock Farming, Neethirajan et al, Feb. 2021; https://www.sciencedirect.com/science/article/pii/S2214180421000131 (Year : 2021).*

*Primary Examiner* — Jianxun Yang

(74) *Attorney, Agent, or Firm* — Jason C. Cameron

(57) ABSTRACT

A system and method for animal disease management is disclosed. The method includes receiving one or more images, one or more videos of one or more animals or a combination thereof and identifying one or more faces of the one or more animals in the one or more images, the one or more videos of one or more animals or a combination thereof. The method further includes extracting one or more facial features and one more muzzle features from the one or more faces and determining one or more facial changes and one or more muzzle changes. The method includes detecting presence or absence of one or more diseases in the one or more animals, predicting likelihood of the one or more diseases or a combination thereof based on the one or more facial changes, the one or more muzzle changes and the predefined information.

18 Claims, 10 Drawing Sheets

(56) References Cited

FOREIGN PATENT DOCUMENTS

| | | |
|---|---|---|
| EP | 3659433 A1 | 6/2020 |
| IN | 202011036246 | 9/2020 |
| JP | 6828928 B1 | 2/2021 |
| WO | 2021133786 A1 | 7/2021 |

* cited by examiner

SYSTEM AND METHOD FOR ANIMAL DISEASE MANAGEMENT

FIELD OF INVENTION

Embodiments of the present disclosure relate to a disease management system and more particularly relates to a system and a method for animal disease management system.

BACKGROUND

Traditionally, other than regular vaccines, health checks on one or more animals, such as livestock, wildlife, domesticated animals and the like are carried out when the one or more animals show symptoms of diseases in advanced stage. Thus, it is often too late to diagnose and treat the diseases resulting in expensive treatment of the diseases and requirement of undesirable measures, such as surgery. While the one or more animals are being treated, the owner loses a significant amount of revenue which was earlier generated via the one or more animals. Further, when the one or more animals are kept together at same place, there is a high likelihood of disease outbreaks leading to loss in the one or more animals' population. Furthermore, when a consumer consumes products of the one or more animals having diseases, the consumer may get sick as well.

Hence, there is a need for a system and method for animal disease management to detect and predict likelihood of disease in one or more animals in order to address the aforementioned issues.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

In accordance with an embodiment of the present disclosure, a computing system for animal disease management is disclosed. The computing system includes one or more software, learning module, hardware processors and a memory coupled to the one or more hardware processors. The memory includes a plurality of modules in the form of programmable instructions executable by the one or more hardware processors. The plurality of modules include a data receiver module configured to receive at least of: one or more images and one or more videos of one or more animals from at least one of: one or more image capturing devices and one or more user devices. The one or more animals include: but not limited to, wildlife, livestock, domesticated animals or any combination thereof. The plurality of modules also include a face identification module configured to identify one or more faces of the one or more animals in the received at least of: one or more images and one or more videos by using a trained disease management-based Machine Learning (ML) model and an image segmentation technique. The plurality of modules further include a data extraction module configured to extract one or more facial features, one or more muzzle features or a combination thereof from the identified one or more faces of the one or more animals by using the trained disease management-based ML model. Furthermore, the plurality of modules include a data determination module configured to determine one or more facial changes, one or more muzzle changes or a combination thereof in the extracted one or more facial features, the one or more muzzle features or a combination thereof associated with the one or more animals by comparing the extracted one or more facial features, the extracted one or more muzzle features with prestored facial features and prestored muzzle features corresponding to the one or more animals by using the trained disease management-based ML model. Also, the plurality of modules include a data management module configured to perform at least one of or a combination of: detecting presence or absence of one or more diseases in the one or more animals based on the determined one or more facial changes, the determined one or more muzzle changes or a combination thereof and predefined information by using the trained disease management-based ML model and predicting likelihood of the one or more diseases in the one or more animals based on the determined one or more facial changes, the determined one or more muzzle changes or a combination thereof and the predefined information by using the trained disease management-based ML model.

In accordance with another embodiment of the present disclosure, a method for animal disease management is disclosed. The method includes receiving, at least of: one or more images and one or more videos of one or more animals from at least one of: one or more image capturing devices and one or more user devices. The one or more animals include: but not limited to, wildlife, livestock, domesticated animals or any combination thereof. The method also includes identifying one or more faces of the one or more animals in the received at least of: one or more images and one or more videos by using a trained disease management-based Machine Learning (ML) model and an image segmentation technique. The method further includes extracting one or more facial features, one or more muzzle features or a combination thereof from the identified one or more faces of the one or more animals by using the trained disease management-based ML model. Further, the method includes determining one or more facial changes, one or more muzzle changes or a combination thereof in the extracted one or more facial features, the extracted one or more muzzle features or a combination thereof associated with the one or more animals by comparing the extracted one or more facial features, the extracted one or more muzzle features or a combination thereof with prestored facial features and prestored muzzle features corresponding to the one or more animals by using the trained disease management-based ML model. Also, the method includes performing at least one of or a combination of detecting presence or absence of one or more diseases in the one or more animals based on the determined one or more facial changes, the determine one or more muzzle changes or a combination thereof and predefined information by using the trained disease management-based ML model and predicting likelihood of the one or more diseases in the one or more animals based on the determined one or more facial changes, the determined one or more muzzle changes or a combination thereof and the predefined information by using the trained disease management-based ML model.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
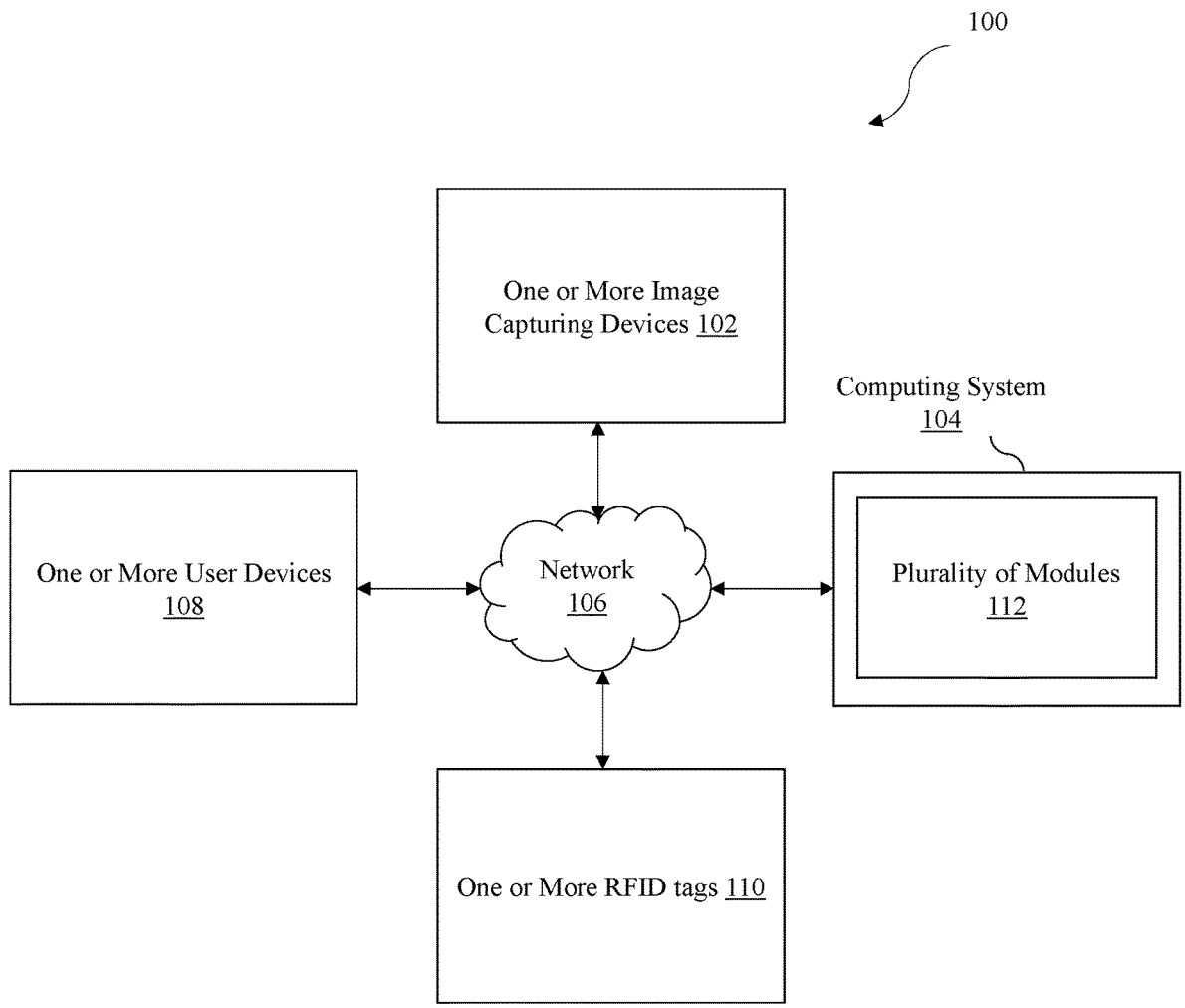
FIG. 1 is a block diagram illustrating an exemplary computing environment for animal disease management, in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION OF THE DISCLOSURE

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

A computer system (standalone, client or server computer system) configured by an application may constitute a "module" (or "subsystem") that is configured and operated to perform certain operations. In one embodiment, the "module" or "subsystem" may be implemented mechanically or electronically, so a module include dedicated circuitry or logic that is permanently configured (within a special-purpose processor) to perform certain operations. In another embodiment, a "module" or "subsystem" may also comprise programmable logic or circuitry (as encompassed within a general-purpose processor or other programmable processor) that is temporarily configured by software to perform certain operations. In another embodiment, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Referring now to the drawings, and more particularly to FIG. 1 through FIG. 10, where similar reference characters denote corresponding features consistently throughout the figures, there are shown preferred embodiments and these embodiments are described in the context of the following exemplary system and/or method.

FIG. 1 is a block diagram illustrating an exemplary computing environment for animal disease management, in accordance with an embodiment of the present disclosure. According to FIG. 1, the computing environment 100 includes one or more image capturing devices 102 communicatively coupled to a computing system 104 via a network 106. In an embodiment of the present disclosure, the one or more image capturing devices 102 are configured to capture one or more images, one or more videos or a combination thereof of one or more animals. The one or more image capturing devices 102 transmit the captured one or more images, the captured one or more videos or a combination thereof to the computing system 104. In an embodiment of the present disclosure, the one or more animals include but not limited to, wildlife, livestock, domesticated animals or any combination thereof. In an exemplary embodiment of the present disclosure, the one or more animals include cow, cat, dog, horse and the like. In an exemplary embodiment of the present disclosure, the one or more images and the one or more videos are in visual-light format, infrared spectrum format or a combination thereof. In an exemplary embodiment of the present disclosure, the network 106 may be internet or any other wireless network. Further, the computing system 104 may be a central server, such as on premise, cloud server or a remote server. The computing environment 100 includes one or more user devices 108 associated with a user communicatively coupled to the computing system 104 via the network 106. The user may be owner of the one or more animals. In an alternate embodiment of the present disclosure, the one or more user devices 108 may also capture the one or more images, the one or more videos or a combination thereof of the one or more animals. The one or more user devices 108 transmit the captured one or more images, the captured one or more videos or a combination thereof to the computing system 104. The user may use the computing system 104 to detect presence or absence of one or more diseases, predict likelihood of the one or more diseases in the one or more animals or a combination thereof. In an exemplary embodiment of the present disclosure, the one or more user devices 108 may include a laptop computer, desktop computer, tablet computer, smartphone, wearable device, smart watch and the like.

In an embodiment of the present disclosure, the computing environment 100 includes one or more Radio Frequency Identification (RFID) tags and/or plastic tag attached on the one or more animals. The one or more RFID tags 110 are used to identify the one or more animals. Further, the one or more user devices includes a local browser, a mobile application or a combination thereof. Furthermore, the user may use a web application via the local browser, the mobile application or a combination thereof to communicate with the computing system 104. The computing system 104 includes a plurality of modules 112. Details on the plurality of modules 112 have been elaborated in subsequent paragraphs of the present description with reference to FIG. 2.

In an embodiment of the present disclosure, the computing system 104 is configured to receive one or more images, one or more videos of the one or more animal or a combination thereof from the one or more image capturing devices 102, the one or more user devices 108 or a combination thereof. The computing system 104 identifies one or more faces of the one or more animals in the received one or more images, one or more videos of the one or more animal or a combination thereof by using a trained disease management-based Machine Learning (ML) model and an image segmentation technique. Further, the computing system 104 also extracts one or more facial features, one or more muzzle features or a combination thereof from the identified one or more faces of the one or more animals by using the trained disease management-based ML model. The computing system 104 determines one or more facial changes, one or more muzzle changes or a combination thereof in the extracted one or more facial features, the extracted one or more muzzle features or a combination thereof associated with the one or more animals by comparing the extracted one or more facial features, the extracted one or more muzzle features or a combination thereof with prestored facial features and prestored facial features corresponding to the one or more animals by using the trained disease management-based ML model. Furthermore, the computing system 104 detects presence or absence of one or more diseases in the one or more animals, predicts likelihood of the one or more diseases in the one or more animals or a combination thereof based on the determined one or more facial changes, the determined one or more muzzle changes or a combination thereof and the predefined information by using the trained disease management-based ML model.

Figure 2:
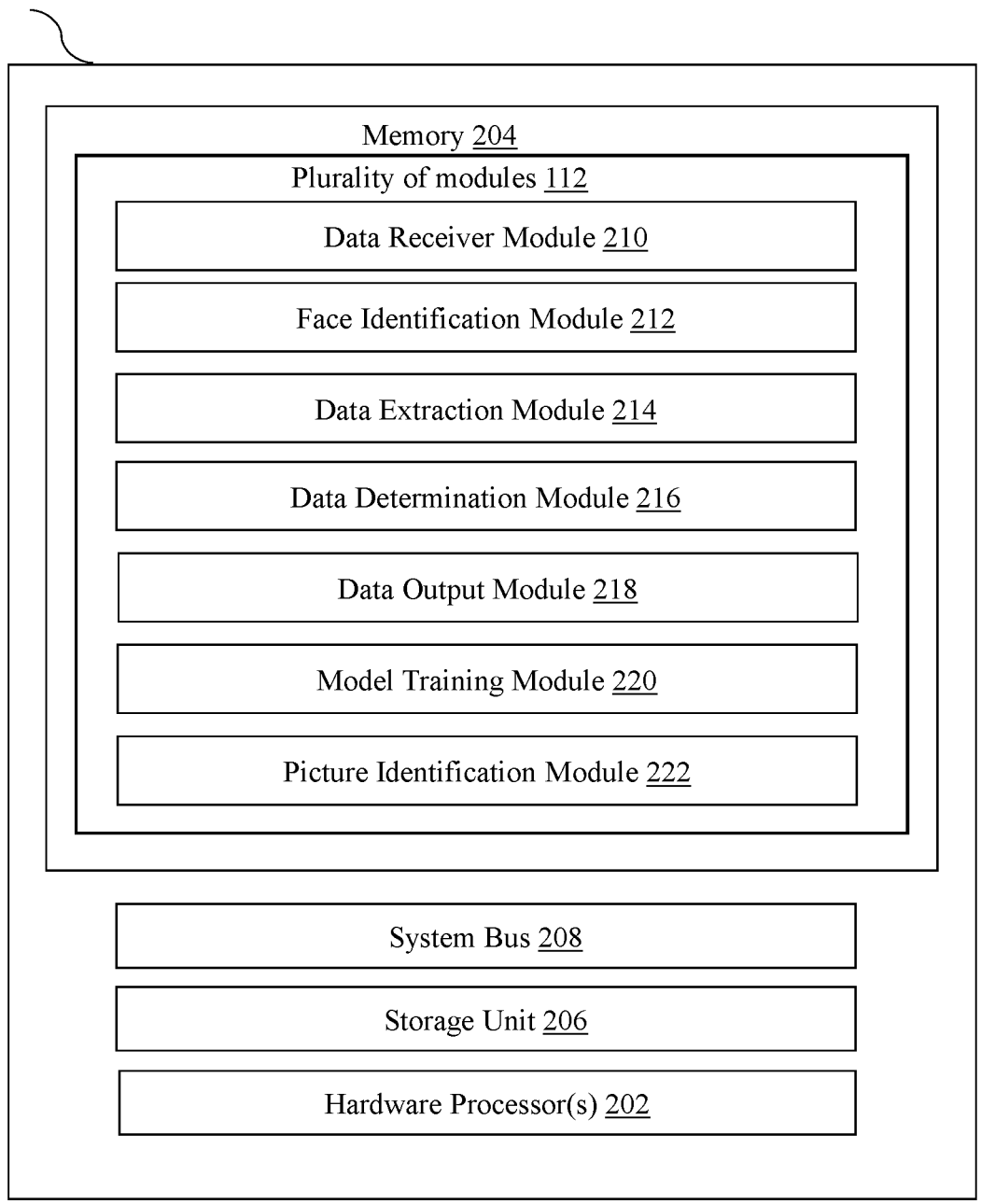
FIG. 2 is a block diagram illustrating an exemplary computing system, such as those shown in FIG. 1, for animal disease management, in accordance with an embodiment of the present disclosure.

FIG. 2 is a block diagram illustrating an exemplary computing system 104, such as those shown in FIG. 1, for animal disease management. The computing system 104 comprises one or more hardware processors 202, a memory 204 and a storage unit 206. The one or more hardware processors 202, the memory 204 and the storage unit 206 are communicatively coupled through a system bus 208 or any similar mechanism. The memory 204 comprises the plurality of modules 112 in the form of programmable instructions executable by the one or more hardware processors 202. Further, the plurality of modules 112 includes a data receiver module 210, a face identification module 212, a data extraction module 214, a data determination module 216, a data output module 218, a model training module 220 and a picture identification module 222.

The one or more hardware processors 202, as used herein, means any type of computational circuit, such as, but not limited to, a microprocessor unit, microcontroller, complex instruction set computing microprocessor unit, reduced instruction set computing microprocessor unit, very long instruction word microprocessor unit, explicitly parallel instruction computing microprocessor unit, graphics processing unit, digital signal processing unit, or any other type of processing circuit. The one or more hardware processors 202 may also include embedded controllers, such as generic or programmable logic devices or arrays, application specific integrated circuits, single-chip computers, and the like.

The memory 204 may be non-transitory volatile memory and non-volatile memory. The memory 204 may be coupled for communication with the one or more hardware processors 202, such as being a computer-readable storage medium. The one or more hardware processors 202 may execute machine-readable instructions and/or source code stored in the memory 204. A variety of machine-readable instructions may be stored in and accessed from the memory 204. The memory 204 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like. In the present embodiment, the memory 204 includes the plurality of modules 112 stored in the form of machine-readable instructions on any of the above-mentioned storage media and may be in communication with and executed by the one or more hardware processors 202.

The storage unit 206 may be a cloud storage. The storage unit 206 may store prestored facial features, prestored muzzle features, extracted one or more facial features, extracted one or more muzzle features, one or more characteristics and prestored ages. The storage unit 206 may also store one or more physiological change parameters.

The data receiver module 210 is configured to receive the one or more images, the one or more videos of the one or more animals or a combination thereof. In an embodiment of the present disclosure, the one or more images, the one or more videos of the one or more animals or a combination thereof may be received from the one or more image capturing devices 102, the one or more user devices 108 or a combination thereof. In an exemplary embodiment of the present disclosure, the one or more images and the one or more videos are in visual-light format, infrared spectrum format and the like. The one or more images, the one or more videos of the one or more animals or a combination thereof may be associated with face, muzzle, body and the like of the one or more animals. Further, the one or more animals include but not limited to, wildlife, livestock, domesticated animals or any combination thereof. In an exemplary embodiment of the present disclosure, the one or more animals include cow, horse, dog, cat and the like.

The face identification module 212 is configured to identify one or more faces of the one or more animals in the received one or more images, the received one or more videos or a combination thereof by using a trained disease management-based Machine Learning (ML) model and an image segmentation technique. In an embodiment of the present disclosure, the trained disease management-based ML model may be ML model, Artificial Intelligence (AI) model or a combination thereof. In identifying the one or more faces of the one or more animals in the received one or more images, the received one or more videos or a combination thereof by using the trained disease management-based ML model and the image segmentation technique, the face identification module 212 converts the received one or more videos into one or more images by using image processing technique. Further, the face identification module 212 separates portion corresponding to the one or more animals in the received one or more images, the converted one or more images or a combination thereof from rest of the received one or more images, the converted one or more images or a combination thereof by using the image segmentation technique. In an alternate embodiment of the present disclosure, the face identification module 212 separates portions corresponding to the one or more animals in received multimedia from rest of the multimedia by using the image segmentation technique. In an embodiment of the present disclosure, the received multimedia includes the received one or more images, the received one or more videos or a combination thereof. The face identification module 212 adds a virtual box in the received one or more images, the converted one or more images or a combination thereof around each of the one or more faces of the one or more animals upon separating portion corresponding to the one or more animals. In an alternate embodiment of the present disclosure, the face identification module 212 adds a virtual box in the received multimedia around each of the one or more faces of the one or more animals upon separating portion corresponding to the one or more animals. The face identification module 212 also displays a probability corresponding to each of the one or more animals in the virtual box. For example, probability of a face in the virtual box to be a cow's face may be 0.99. Furthermore, the face identification module 212 crops the one or more faces of the one or more animals from the received one or more images, the converted one or more images or a combination thereof upon adding the virtual box. In alternate embodiment of the present disclosure, the face identification module 212 crops the one or more faces of the one or more animals from the received multimedia upon adding the virtual box. In an embodiment of the present disclosure, the cropping of the one or more faces of the one or more animals may be performed virtually upon recognition of muzzle part of the one or more animals, such that it may not be required to crop and remove a portion of image from the received one or more images, the converted one or more images or a combination thereof. The cropping of the one or more faces of the one or more animals improves accuracy of the trained disease management-based ML model, reduces storage requirements and processing costs. However, the cropping may not be required as long as the trained disease management-based ML model is able to view appropriate area associated with the one or more faces of the one or more animals. The face identification module 212 generates a segmentation map corresponding to the cropped one or more faces of the one or more animals by using the image segmentation technique. In an embodiment of the present disclosure, the segmentation map may be a virtual map to facilitate recognition of one or more portions of the image to be reviewed. In an embodiment of the present disclosure, the segmentation map include muzzle map and the facial map. While using the image segmentation technique, every pixel of the received one or more images, the converted one or more images or a combination thereof is classified as either pertaining to the one or more animals or not pertaining to the one or more animals, such that it may be determined that which portions of the image represent the one or more animals and background of the image. The facial map represents the one or more facial features of the one or more animals. In an embodiment of the present disclosure, the facial map may be generated based on pixels corresponding to the one or more facial features. In an embodiment of the present disclosure, a muzzle map is extracted based on the generated facial map. The muzzle map represents the one or more muzzle features. Further, the face identification module 212 determines a set of pixels corresponding to the one or more faces of the one or more animals based on the generated segmentation map by using the trained disease management-based ML model. In an embodiment of the present disclosure, the face identification module 212 may also determine the set of pixels corresponding to entire body of the one or more animals. In an embodiment of the present disclosure, the trained disease management-based ML model may be deep neural network or deep convolutional neural network.

The picture identification module 222 is configured to identify at least one picture from the one or more images, the one or more converted images or a combination thereof having most suitable angle by using a trained picture identification model. In an alternate embodiment of the present disclosure, the picture identification module identifies at least one picture from the received multimedia having most suitable angle by using a trained picture identification model. In an embodiment of the present disclosure, the trained picture identification model may be based on Virtual Reality (VR), Augmented Reality (AR), digital art such as metaverse, live field testing or any combination thereof. In an embodiment of the present disclosure, the at least one picture may be identified from the one or more images, the one or more converted images or a combination thereof having most suitable angle by using the trained picture identification model, such that the face identification module 212 identifies the one or more faces of the one or more animals in the identified at least one picture. In an embodiment of the present disclosure, the identified at least one picture depicts entire muzzle, entire face of each of the one or more animals or a combination thereof and various angle pictures converting to one full picture of face and muzzle. When the picture identification module 222 fails to identify the at least one picture from the one or more images, the one or more converted images or a combination thereof, the picture identification module 222 prompts the user to re-capture one or more images, one or more videos or a combination thereof of the one or more animals. In an embodiment of the present disclosure, before using the trained picture identification model, picture identification model is trained based on the one or more images, the one or more videos or a combination thereof to identify the at least one picture depicting entire muzzle, entire face of each of the one or more animals or a combination thereof.

The data extraction module 214 is configured to extract one or more facial features, one or more muzzle features or a combination thereof from the identified one or more faces of the one or more animals by using the trained disease management-based ML model. In an exemplary embodiment of the present disclosure, the one or more facial features may include eyes, ears, nose, horns, mouth, location of the ears, distance between the ears, distance between the eyes of the one or more animals and the like. In an exemplary embodiment of the present disclosure, the one or more muzzle features may include muzzle, shape of the muzzle, size of the muzzle, color of the muzzle and the like.

The data determination module 216 is configured to determine one or more facial changes, one or more muzzle changes or a combination thereof in the extracted one or more facial features, the extracted one or more muzzle features or a combination thereof associated with the one or more animals by comparing the extracted one or more facial features, the extracted one or more muzzle features or a combination thereof with prestored facial features and prestored muzzle features corresponding to the one or more animals by using the trained disease management-based ML model. The extracted one or more facial features, the extracted one or more muzzle features or a combination thereof are uploaded on the trained disease management-based ML model for determining the one or more facial changes, the one or more muzzle changes or a combination thereof associated with the one or more animals. In an alternate embodiment of the present disclosure, the data determination module 216 compares recent photographs, old photographs or a combination thereof of the one or more animals stored in the storage unit 206 with the received one or more images, the one or more converted images or a combination thereof to determine the one or more facial changes, the one or more muzzle changes or a combination thereof corresponding to the one or more animals. In an embodiment of the present disclosure, the recent photographs, the old photographs or a combination thereof may be captured when the one or more animals may be healthy or sick. The recent photographs, the old photographs or a combination thereof may be associated with face, muzzle, body and the like of the one or more animals. In determining the one or more facial changes, the one or more muzzle changes or a combination thereof in the extracted one or more facial features, the extracted one or more muzzle features or a combination thereof associated with the one or more animals by comparing the extracted one or more facial features, the extracted one or more muzzle features or a combination thereof with the prestored facial features and the prestored muzzle features corresponding to the one or more animals by using the trained disease management-based ML model, the data determination module 216 maps the extracted one or more facial features, the one or more muzzle features or a combination thereof of the one or more animals with the prestored facial features and the prestored muzzle features. Further, the data determination module 216 identifies the one or more animals based on the result of mapping. The data determination module 216 fetches the prestored facial features and the prestored muzzle features corresponding to each of the identified one or more animals. Furthermore, the data determination module 216 determines the one or more facial changes, the one or more muzzle changes or a combination thereof in the extracted one or more facial features, the extracted one or more muzzle features or a combination thereof of each of the identified one or more animals by comparing the extracted one or more facial features, the extracted one or more muzzle features or a combination thereof of each of the identified one or more animals with the fetched prestored facial features and the fetched prestored muzzle features. In an embodiment of the present disclosure, the data determination module 216 may compare the generated facial map of the one or more animals with prestored facial map associated with the one or more animals, the generated muzzle map of the one or more animals with prestored muzzle map associated with the one or more animals or a combination thereof to determine the one or more facial changes, one or more muzzle changes or a combination thereof corresponding to the one or more animals.

Further, the data determination module 216 is also configured to distinguish an animal from the one or more animals by comparing facial features, muzzle features or a combination thereof of the animal with prestored facial features and prestored muzzle features corresponding to the one or more animals. For example, when the one or more images, the converted one or more images or a combination thereof include multiple cows, muzzle features of a particular cow is compared with prestored muzzle features corresponding to muzzles of the multiple cows to identify and distinguish the particular cow from the multiple cows. Similarly, each cow may be distinguished from other cows associated with the multiple cows.

The data management module is configured to detect presence or absence of one or more diseases in the one or more animals, predict likelihood of the one or more diseases in the one or more animals or a combination thereof based on the determined one or more facial changes, the determined one or more muzzle changes or a combination thereof and the predefined information by using the trained disease management-based ML model. In an alternate embodiment of the present disclosure, the data management module is configured to detect presence or absence of one or more diseases in the one or more animals, predict likelihood of the one or more diseases in the one or more animals or a combination thereof based on the extracted one or more facial features, the extracted one or more muzzle features or a combination thereof and the predefined information by using the trained disease management-based ML model. In an embodiment of the present disclosure, the predefined information include one or more characteristics assigned to each of the one or more facial features, the one or more muzzle features or a combination thereof of the animals and one or more physiological change parameters. In an exemplary embodiment of the present disclosure, the one or more diseases may include Mastitis, pneumonia, flu, respiratory disease, shipping fever, skin disease and the like. In an embodiment of the present disclosure, before using the trained disease management-based ML model for identifying the one or more animals, extracting the one or more facial features, extracting the one or more muzzle features, determining the one or more facial changes, detecting presence or absence of the one or more diseases and predicting the likelihood of the one or more diseases, the disease management-based ML model is required to be trained by the model training module 220. In an alternate embodiment of the present disclosure, the disease management-based ML model may be an already trained model.

The model training module 220 is configured to train the disease management-based ML model based on the one or more images, the one or more videos of the one or more animals or a combination thereof, the extracted one or more facial features, the extracted one or more muzzle features and the set of pixels. In training the disease management-based ML model based on the one or more images, the one or more videos of the one or more animals or a combination thereof, the extracted one or more facial features, the extracted one or more muzzle features and the set of pixels, the model training module 220 trains the disease management-based ML model based on the one or more images, the one or more videos of the one or more animals or a combination thereof to identify the one or more animals. Further, the model training module 220 trains the disease management-based ML model based on the one or more facial features, the one or muzzle features and the set of pixels corresponding to the one or more facial features and the one or more muzzle features of the one or more animals. In an embodiment of the present disclosure, the disease management-based ML model is trained based on the one or more facial features and the one or more muzzle features of the one or more animals extracted at multiple growth stage of the one or more animals to determine changes in the one or more faces of the one or more animals over time. For example in case of a cow, the one or more facial features and the one or more muzzle features of the cow extracted at various growth stages including calf stage, heifer stage and cow stage are fed to the disease management-based ML model to determine changes in the one or more faces of the one or more animals over time. Thus, the disease management-based AI model is configured to determine the one or more facial changes, one or more muzzle changes or a combination by comparing the extracted one or more facial features, the extracted one or more muzzle features or a combination thereof with the prestored facial features and the prestored muzzle features stored recently or at an earlier time. The trained disease management-based ML model represents the one or more characteristics assigned to each of the one or more facial features and the one or more muzzle features of the one or more animals. In an embodiment of the present disclosure, the one or more characteristics include the one or more physiological change parameters associated with the one or more facial features and the one or more muzzle features. In an exemplary embodiment of the present disclosure, the one or more physiological change parameters include change in color of eyes, change in shape of muzzle, change in size of muzzle, change in color of face and the like. In an embodiment of the present disclosure, each of the one or more physiological change represents a disease. For example, pink eye in the cow may represent Infectious Bovine Keratoconjunctivitis (IBK) disease.

Further, in detecting presence or absence of the one or more diseases in the one or more, predicting likelihood of the one or more diseases in the one or more animals or a combination thereof based on the determined one or more facial changes, the determined one or more muzzle changes or a combination thereof and the predefined information by using the trained disease management-based ML model, the data management module correlates the determined one or more facial changes, the determined one or more muzzle changes or a combination thereof and the one or more physiological change parameters by using the trained disease management-based ML model. Further, the data management module detects presence or absence of the one or more diseases in the one or more animals based on the result of correlation. In an embodiment of the present disclosure, the data management module classifies the one or more animals as sick or healthy based on the result of correlation. For example, when an image of a cow's muzzle is received, one or more muzzle features corresponding to the cow's muzzle is extracted. Further, one or more muzzle changes in the extracted one or more muzzle features is determined by comparing the extracted one or more muzzle features with prestored muzzle features. Furthermore, the data management module classifies the cow as sick or healthy based on the determined one or more muzzle changes and the predefined information by using the trained disease management-based ML model. Further, the data management module predicts likelihood of the one or more diseases in the one or more animals based on the result of correlation. For example, the data management module predicts likelihood of pink eye disease three days prior to occurrence of the pink eye disease based on the result of correlation.

The data output module 218 is configured to output the detected presence or absence of the one or more diseases and the predicted likelihood of the one or more diseases to the one or more user devices 108 associated with the user.

In operation, the one or more image capturing devices 102, the one or more user devices 108 or a combination thereof capture the one or more images, the one or more videos of the one or more animal or a combination thereof. Further, the captured one or more images, the captured one or more videos of the one or more animal or a combination thereof are transmitted to the computing system 104. The computing system 104 receives the captured one or more images, the captured one or more videos of the one or more animal or a combination thereof. The computing system 104 further identifies one or more faces of the one or more animals in the received one or more images, the received one or more videos of the one or more animal or a combination thereof by using the trained disease management-based ML model and the image segmentation technique. Further, the computing system 104 also extracts one or more facial features, the one or more muzzle features or a combination thereof from the identified one or more faces of the one or more animals by using the trained disease management-based ML model. The computing system 104 determines the one or more facial changes, one or more muzzle changes or a combination thereof in the extracted one or more facial features the extracted one or more muzzle features or a combination thereof associated with the one or more animals by comparing the extracted one or more facial features, the extracted one or more muzzle features or a combination thereof with the prestored facial features and the prestored muzzle features corresponding to the one or more animals by using the trained disease management-based ML model. Furthermore, the computing system 104 detects presence or absence of the one or more diseases in the one or more animals, predicts likelihood of the one or more diseases in the one or more animals or a combination thereof based on the determined one or more facial changes, the determined one or more muzzle changes or a combination thereof and the predefined information by using the trained disease management-based ML model.

Figure 3:
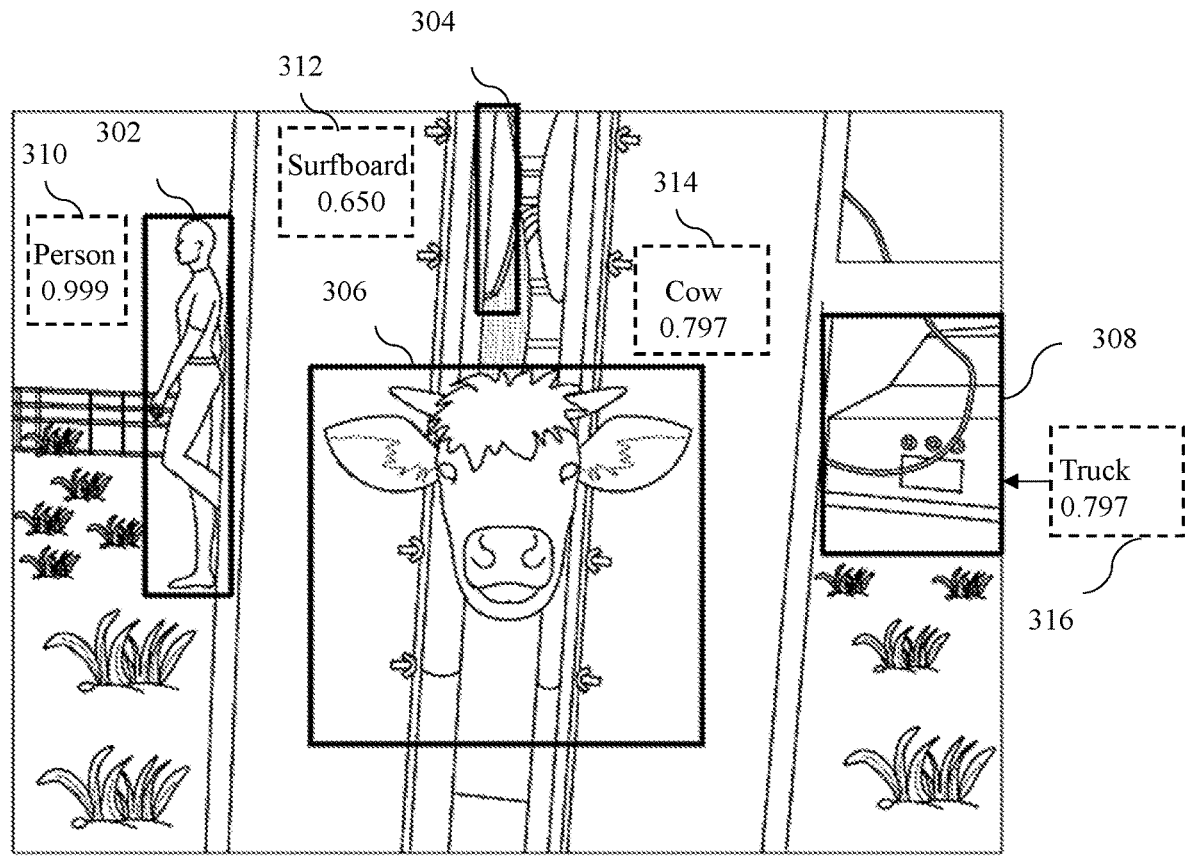
FIG. 3 is a pictorial exemplary depiction of application of image segmentation technique on an image, in accordance with an embodiment of the present disclosure.

FIG. 3 is a pictorial exemplary depiction of application of image segmentation technique on an image, in accordance with an embodiment of the present disclosure. When the image segmentation technique is applied on the image, a virtual box is added around each of one or more objects in the image. The one or more objects in the image are person, surfboard, cow and truck. The virtual box around the person is represented by 302, the virtual box around the surfboard is represented by 304, the virtual box around the cow is represented by 306, the virtual box around the truck is represented by 308. The face identification module 212 also identifies each of the one or objects and displays name and probability of corresponding to each of the identified one or more objects. The face identification module 212 displays name and probability corresponding to person as "person 0.999" 310, surfboard as "surfboard 0.650" 312, cow as "cow 0.797" 314 and truck as "truck 0.797" 316, as depicted in FIG. 3.

Figure 4:
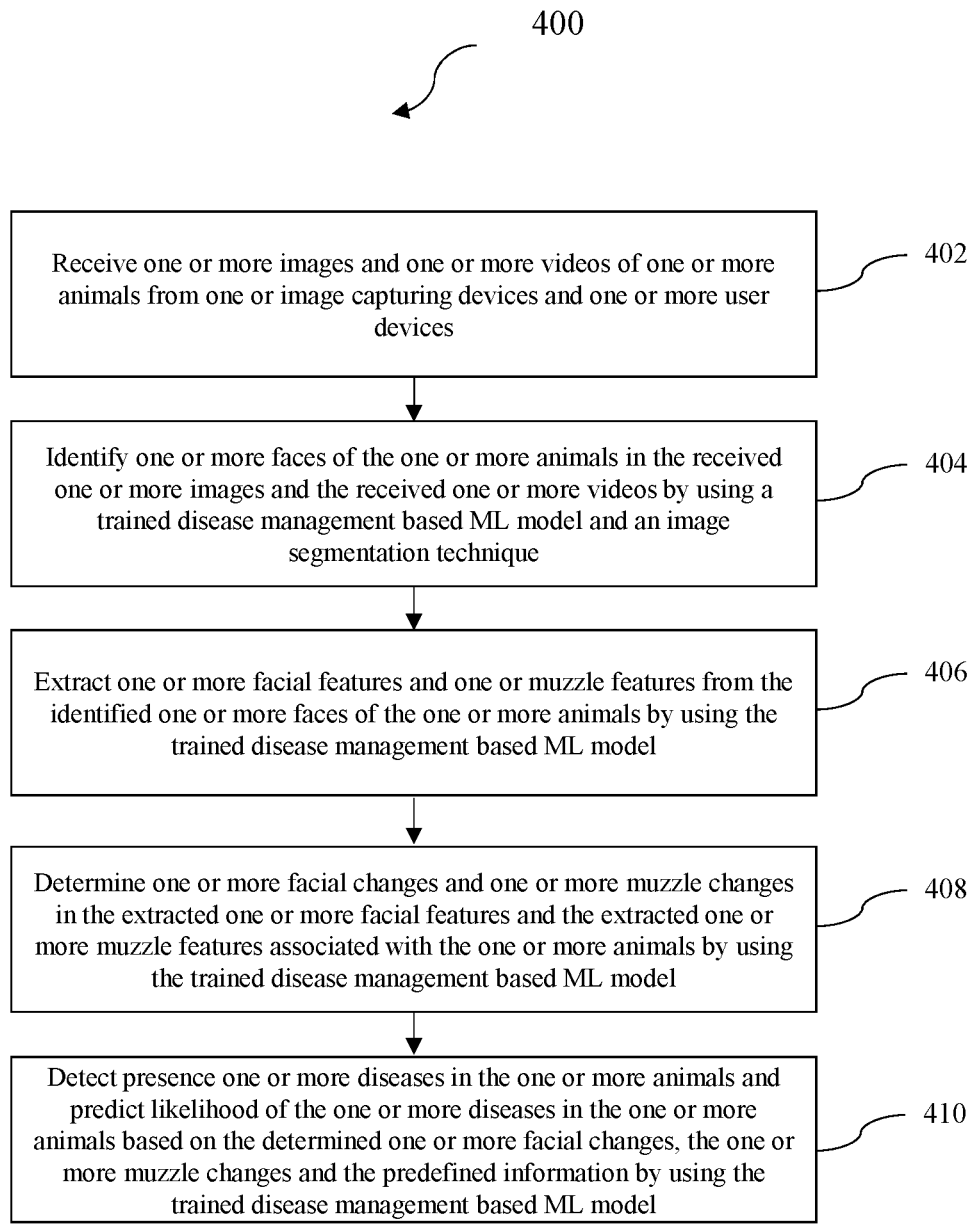
FIG. 4 is a process flow diagram illustrating an exemplary method for animal disease management, in accordance with an embodiment of the present disclosure.

FIG. 4 is a process flow diagram illustrating an exemplary method 400 for animal disease management, in accordance with an embodiment of the present disclosure. At step 402, one or more images, the one or more videos of one or more animals or a combination thereof is received from one or more image capturing devices 102, one or more user devices 108 and or a combination thereof. In an embodiment of the present disclosure, the one or more animals include but not limited to, wildlife, livestock, domesticated animals or any combination thereof. In an exemplary embodiment of the present disclosure, the one or more animals include cow, cat, dog horse and the like. In an exemplary embodiment of the present disclosure, the one or more images and the one or more videos are visual-light format, infrared spectrum format or a combination thereof. The user may be owner of the one or more animals. In an exemplary embodiment of the present disclosure, the one or more user devices 108 may include a laptop computer, desktop computer, tablet computer, smartphone, wearable device, smart watch and the like.

At step 404, one or more faces of the one or more animals is identified in the received one or more images, the received one or more videos or a combination thereof by using a trained disease management-based Machine Learning (ML) model and an image segmentation technique. In an embodiment of the present disclosure, the trained disease management-based ML model may be ML model, Artificial Intelligence (AI) model or a combination thereof. In identifying the one or more faces of the one or more animals in the received one or more images, the received one or more videos or a combination thereof by using the trained disease management-based ML model and the image segmentation technique, the method 400 includes converting the received one or more videos into one or more images by using image processing technique. Further, the method 400 includes separating portion corresponding to the one or more animals in the received one or more images, the converted one or more images or a combination thereof from rest of the received one or more images, the converted one or more images or a combination thereof by using the image segmentation technique. In an alternate embodiment of the present disclosure, the method includes separating portions corresponding to the one or more animals in received multimedia from rest of the multimedia by using the image segmentation technique. In an embodiment of the present disclosure, the received multimedia includes the received one or more images, the received one or more videos or a combination thereof. The method 400 includes adding a virtual box in the received one or more images, the converted one or more images or a combination thereof around each of the one or more faces of the one or more animals upon separating portion corresponding to the one or more animals. In an alternate embodiment of the present disclosure, the face method includes adding a virtual box in the received multimedia around each of the one or more faces of the one or more animals upon separating portion corresponding to the one or more animals. The method 400 also includes displaying a probability corresponding to each of the one or more animals in the virtual box. For example, probability of a face in the virtual box to be a cow's face may be 0.99. Furthermore, the method 400 includes cropping the one or more faces of the one or more animals from the received one or more images, the converted one or more images or a combination thereof upon adding the virtual box. In alternate embodiment of the present disclosure, the method includes cropping the one or more faces of the one or more animals from the received multimedia upon adding the virtual box. In an embodiment of the present disclosure, the cropping of the one or more faces of the one or more animals may be performed virtually upon recognition of muzzle part of the one or more animals, such that it may not be required to crop and remove a portion of image from the received one or more images, the converted one or more images or a combination thereof. The method 400 includes generating a segmentation map corresponding to the cropped one or more faces of the one or more animals by using the image segmentation technique. In an embodiment of the present disclosure, the segmentation map may be a virtual map to facilitate recognition of one or more portions of the image to be reviewed. In an embodiment of the present disclosure, the segmentation map include muzzle map and the facial map. While using the image segmentation technique, every pixel of the received one or more images, the converted one or more images or a combination thereof is classified as either pertaining to the one or more animals or not pertaining to the one or more animals, such that it may be determined that which part of the image represent the one or more animals and background. The facial map represents one or more facial features of the one or more animals. In an embodiment of the present disclosure, the facial map may be generated based on pixels corresponding to the one or more facial features. In an embodiment of the present disclosure, a muzzle map is extracted based on the generated facial map. The muzzle map represents one or more muzzle features of the one or more animals. Further, the method 400 includes determining a set of pixels corresponding to the one or more faces of the one or more animals based on the generated segmentation map by using the trained disease management-based ML model. In an embodiment of the present disclosure, the method 400 may also include determining the set of pixels corresponding to entire body of the one or more animals. In an embodiment of the present disclosure, the trained disease management-based ML model may be deep neural network or deep convolutional neural network.

Further, the method 400 includes identifying at least one picture from the one or more images, the one or more converted images or a combination thereof having most suitable angle by using a trained picture identification model. In an alternate embodiment of the present disclosure, the method includes identifying at least one picture from the received multimedia having most suitable angle by using a trained picture identification model. In an embodiment of the present disclosure, the trained picture identification model may be based on Virtual Reality (VR), Augmented Reality (AR), digital art such as metaverse, live field testing or a combination thereof. In an embodiment of the present disclosure, the at least one picture may be identified from the one or more images, the one or more converted images or a combination thereof having most suitable angle by using the trained picture identification model, such that the one or more faces of the one or more animals are identified in the identified at least one picture. In an embodiment of the present disclosure, the identified at least one picture depicts entire muzzle, entire face of each of the one or more animals or a combination thereof and various angle pictures converting to one full picture of face and muzzle. When the at least one picture may not be identified from the one or more images, the one or more converted images or a combination thereof, the user is prompted to re-capture one or more images, one or more videos or a combination thereof of the one or more animals. In an embodiment of the present disclosure, before using the trained picture identification model, picture identification model is trained based on the one or more images, the one or more videos or a combination thereof to identify the at least one picture depicting entire muzzle, entire face of each of the one or more animals or a combination thereof.

At step 406, one or more facial features, one or more muzzle features or a combination thereof are extracted from the identified one or more faces of the one or more animals by using the trained disease management-based ML model. In an exemplary embodiment of the present disclosure, the one or more facial features may include, eyes, ears, nose, horns, mouth, location of the ears, distance between the ears, distance between the eyes of the one or more animals and the like. In an exemplary embodiment of the present disclosure, the one or more muzzle features may include muzzle, shape of the muzzle, size of the muzzle, color of the muzzle and the like.

At step 408, one or more facial changes, one or more muzzle changes or a combination thereof are determined in the extracted one or more facial features, the extracted one or more muzzle features or a combination thereof associated with the one or more animals by comparing the extracted one or more facial features, the extracted one or more muzzle features or a combination thereof with prestored facial features and prestored muzzle features corresponding to the one or more animals by using the trained disease management-based ML model. The extracted one or more facial features, the extracted one or more muzzle features or a combination thereof are uploaded on the trained disease management-based ML model for determining the one or more facial changes, the one or more muzzle changes or a combination thereof associated with the one or more animals. In determining the one or more facial changes, the one or more muzzle changes or a combination thereof in the extracted one or more facial features, the extracted one or more muzzle features or a combination thereof associated with the one or more animals by comparing the extracted one or more facial features, the extracted one or more muzzle features or a combination thereof with the prestored facial features and the prestored muzzle features corresponding to the one or more animals by using the trained disease management-based ML model, the method 400 includes mapping the extracted one or more facial features, the extracted one or more muzzle features or a combination thereof of the one or more animals with the prestored facial features and the prestored muzzle features. Further, the method 400 includes identifying the one or more animals based on the result of mapping. The method 400 includes fetching the prestored facial features and the prestored muzzle features corresponding to each of the identified one or more animals. Furthermore, the method 400 includes determining the one or more facial changes, the one or more muzzle changes or a combination thereof in the extracted one or more facial features, the extracted one or more muzzle features or a combination thereof of each of the identified one or more animals by comparing the extracted one or more facial features, the extracted one or more muzzle features or a combination thereof of each of the identified one or more animals with the fetched prestored facial features and the fetched prestored muzzle features. In an embodiment of the present disclosure, the method 400 includes comparing the generated facial map of the one or more animals with prestored facial map associated with the one or more animals, the generated muzzle map of the one or more animals with prestored muzzle map associated with the one or more animals or a combination thereof to determine the one or more facial changes, the one or more muzzle changes or a combination thereof corresponding to the one or more animals.

Further, the method 400 includes distinguishing an animal from one or more animals by comparing facial features of the animal, muzzle features or a combination thereof with prestored facial features and prestored muzzle features corresponding to the one or more animals. For example, when the one or more images, the converted one or more images or a combination thereof include multiple cows, muzzle features corresponding to muzzle of a particular cow is compared with prestored muzzle features corresponding to muzzles of the multiple cows to distinguish the particular cow from the multiple cows. Similarly, each cow may be distinguished from other cows associated with the multiple cows.

At step 410, the method includes detecting presence or absence of one or more diseases in the one or more animals, predicting likelihood of the one or more diseases in the one or more animals or a combination thereof based on the determined one or more facial changes, the determined one or more muzzle changes or a combination thereof and the predefined information by using the trained disease management-based ML model. In an alternate embodiment of the present disclosure, the method 400 includes detecting presence or absence of one or more diseases in the one or more animals, predicting likelihood of the one or more diseases in the one or more animals or a combination thereof based on the extracted one or more facial features, the extracted one or more muzzle features or a combination thereof and the predefined information by using the trained disease management-based ML model. In an exemplary embodiment of the present disclosure, the one or more diseases may include Mastitis, pneumonia, flu, respiratory disease, shipping fever, skin disease and the like. In an embodiment of the present disclosure, the predefined information include one or more characteristics assigned to each of the one or more facial features, the one or more muzzle features or a combination thereof of the animals and one or more physiological change parameters. In an embodiment of the present disclosure, before using the trained disease management-based ML model for identifying the one or more animals, extracting the one or more facial features, extracting the one or more muzzle features, determining the one or more facial changes, determining the one or more muzzle changes, detecting presence or absence of the one or more diseases and predicting the likelihood of the one or more diseases, the disease management-based ML model is required to be trained. In an alternate embodiment of the present disclosure, the disease management-based ML model may be an already trained model.

Further, the method 400 includes training the disease management-based ML model based on the one or more images, the one or more videos of the one or more animals or a combination thereof, the extracted one or more facial features, the extracted one or more muzzle features or a combination thereof and the set of pixels. In training the disease management-based ML model based on the one or more images, the one or more videos of the one or more animals or a combination thereof, the extracted one or more facial features, the extracted one or more muzzle features or a combination thereof and the set of pixels, the method 400 includes training the disease management-based ML model based on the one or more images, the one or more videos of the one or more animals or a combination thereof to identify the one or more animals. Further, the method 400 includes training the disease management-based ML model based on the one or more facial features, the one or more muzzle features or a combination thereof and the set of pixels corresponding to the one or more facial features, the one or more muzzle features or a combination thereof of the one or more animals. In an embodiment of the present disclosure, the disease management-based ML model is trained based on the one or more facial features, one or more muzzle features or a combination thereof of the one or more animals extracted at multiple growth stage of the one or more animals to determine changes in the one or more faces of the one or more animals over time. Thus, the disease management-based AI model is configured to determine the one or more facial changes, one or more muzzle changes or a combination by comparing the extracted one or more facial features, the extracted one or more muzzle features or a combination thereof with the prestored facial features and the prestored muzzle features stored recently or at an earlier time. The trained disease management-based ML model represents the one or more characteristics assigned to each of the one or more facial features, the one or more muzzle features or a combination thereof of the one or more animals. In an embodiment of the present disclosure, the one or more characteristics include the one or more physiological change parameters associated with the one or more facial features, the one or more muzzle features or a combination thereof. In an exemplary embodiment of the present disclosure, the one or more physiological change parameters include change in color of eyes, change in shape of muzzle, change in size of muzzle, change in color of face and the like. In an embodiment of the present disclosure, each of the one or more physiological change represents a disease. For example, pink eye in the cow may represent Infectious Bovine Keratoconjunctivitis (IBK) disease.

Furthermore, in detecting presence or absence of the one or more diseases in the one or more animals, predicting likelihood of the one or more diseases in the one or more animals or a combination thereof based on the determined one or more facial changes, one or more muzzle changes or a combination thereof and the predefined information by using the trained disease management-based ML model, the method 400 includes correlating the determined one or more facial changes, the determined one or more muzzle changes or a combination thereof and the one or more physiological change parameters by using the trained disease management-based ML model. Further, the method 400 includes detecting presence or absence of the one or more diseases in the one or more animals based on the result of correlation. In an embodiment of the present disclosure, the method 400 includes classifying the one or more animals as sick or healthy based on the result of correlation. The method 400 includes predicting likelihood of the one or more diseases in the one or more animals based on the result of correlation.

Further, the method 400 includes outputting the detected presence or absence of the one or more diseases and the predicted likelihood of the one or more diseases to the one or more user devices 108 associated with the user.

The method 400 may be implemented in any suitable hardware, software, firmware, or combination thereof.

Figure 5:
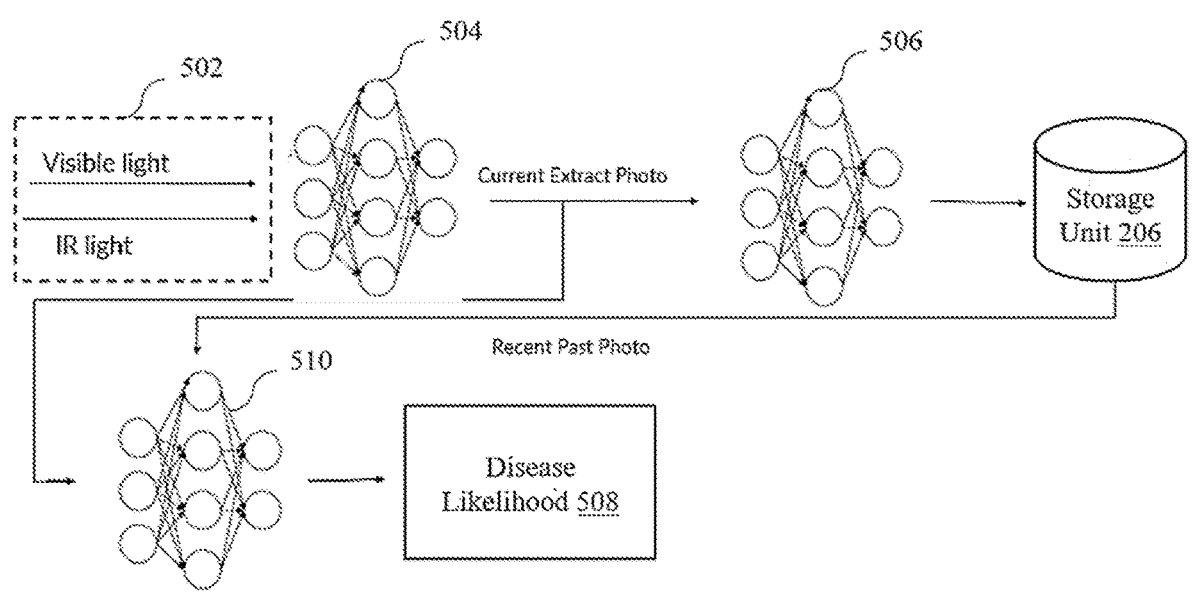
FIG. 5 is a schematic exemplary representation of predicting likelihood of one or more diseases in one or more animals, in accordance with an embodiment of the present disclosure.

FIG. 5 is a schematic exemplary representation of predicting likelihood of one or more diseases in one or more animals, in accordance with an embodiment of the present disclosure. The one or more images, the one or more videos of the one or more animals or a combination thereof is received in visual-light format and infrared spectrum format 502, as shown in FIG. 5. The received one or more videos are converted into one or more images. Further, extraction network 504 i.e., the trained disease management-based ML model separates portion corresponding to the one or more animals in the received one or more images, the converted one or more images or a combination thereof. Furthermore, Re-ID network 506 i.e., the trained disease management-based ML model identifies the one or more animals in the separated portion corresponding to the one or more animals. Further, recent photographs, old photographs or a combination thereof of the identified one or more animals are extracted from the storage unit 206. Furthermore, the recent photographs, the old photographs or a combination thereof of the one or more animals are compared with the received one or more images, the one or more converted images or a combination thereof to determine the one or more facial changes, the one or more muzzle changes or a combination thereof corresponding to the one or more animals. In an embodiment of the present disclosure, the recent photographs, the old photographs or a combination thereof may be captured when the one or more animals may be healthy or sick. The recent photographs, the old photographs or a combination thereof may be associated with face, muzzle, body and the like of the one or more animals. Likelihood of the one or more diseases 508 in the one or more animals are predicted based on the determined one or more facial changes, the determined one or more muzzle changes or a combination thereof by using a diseases network 510 i.e., the trained disease management-based ML model.

Figure 6:
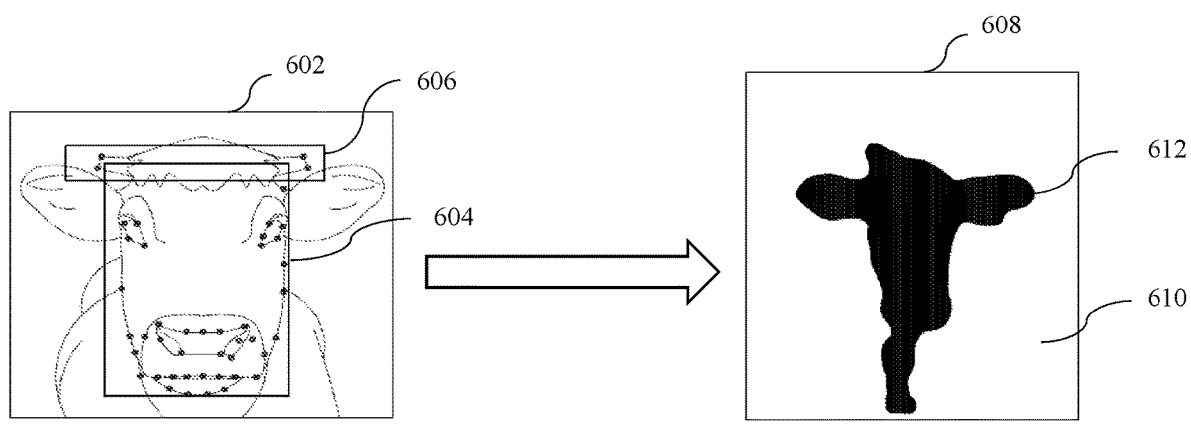
FIG. 6 is a schematic exemplary representation of generating a segmentation map, in accordance with an embodiment of the present disclosure.

FIG. 6 is a schematic exemplary representation of generating a segmentation map, in accordance with an embodiment of the present disclosure. Two virtual boxes are added in input image 602 corresponding to the animal depicted in the input image 602, as shown in FIG. 6. In the current scenario, the animal is cow. First virtual box 604 is added around face of the cow and second virtual box 606 is added around horns of the cow. Further, a segmentation map 608 is generated corresponding to entire face of the cow by using the image segmentation technique. The segmentation map 608 represents background 610 of the input image 602 and cow's face 612. In the current scenario, the segmentation map 608 is the facial map. In an embodiment of the present disclosure, every pixel of the input image 602 is classified as either pertaining to the cow or background 610 of the input image 602. Furthermore, the one or more facial features, the one or more muzzle features or a combination thereof are extracted from the face of the cow by using the trained disease management-based ML model, such that it may be determined that which portions of the input image 602 represent the cow's face 612 and background 610 of the input image 602.

Figure 7:
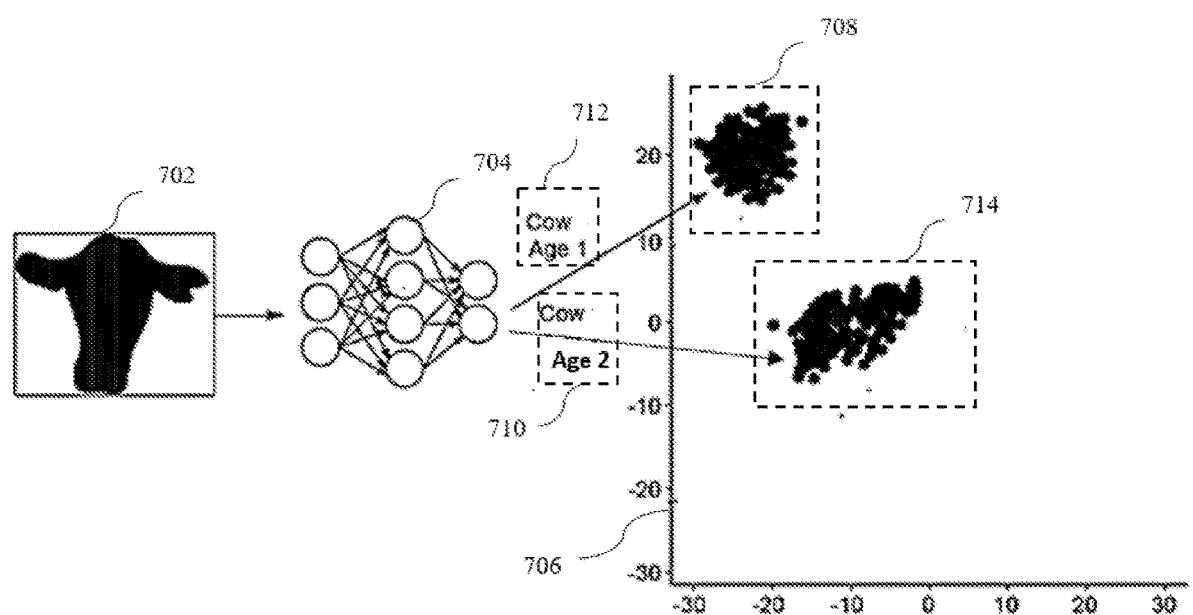
FIG. 7 is a schematic exemplary representation for identification of the one or more animals, in accordance with an embodiment of the present disclosure.

FIG. 7 is a schematic exemplary representation for identification of the one or more animals, in accordance with an embodiment of the present disclosure. In the current scenario, feature extraction 702 is performed on an input image 704 of a cow to extract the one or more facial features, the one or more muzzle features or a combination thereof, as shown in FIG. 7. Further, the extracted one or more facial features, the extracted one or more muzzle features or a combination thereof are uploaded on the trained disease management-based ML model 706, such that one or more previously captured images of the cow may be fetched from the storage unit 206 based on the extracted one or more facial features, the extracted one or more muzzle features or a combination thereof. For example, the one or more previously captured images may have been captured 1 year ago, 2 weeks ago, 2 days ago and the like. The extracted one or more facial features, the extracted one or more muzzle features or a combination thereof is represented by 708. In the current scenario, the input image is captured when cow's age is 2 year as represented by 710 and the one or more previously captured images are captured when cow's age is 1 years as represented by 712. In an embodiment of the present disclosure, facial features, muzzle features or a combination thereof may be extracted from the fetched one or more previously captured images. The facial features, the muzzle features or a combination is represented by 714. Furthermore, the one or more facial changes, the one or more muzzle changes or a combination thereof associated with the cow is determined by comparing the extracted one or more facial features, the extracted one or more muzzle features or a combination thereof 708 corresponding to the input image 704 with the extracted facial features, the extracted muzzle features or a combination thereof 714 corresponding to the fetched one or more previously captured images of the cow by using the trained disease management-based ML model 706. Further, detection of presence or absence of the one or more diseases, prediction of likelihood of the one or more diseases in the cow or a combination thereof may be performed based on the determined one or more facial changes, the determined one or more muzzle changes or a combination thereof and the predefined information by using the trained disease management-based ML model 706.

Figure 8:
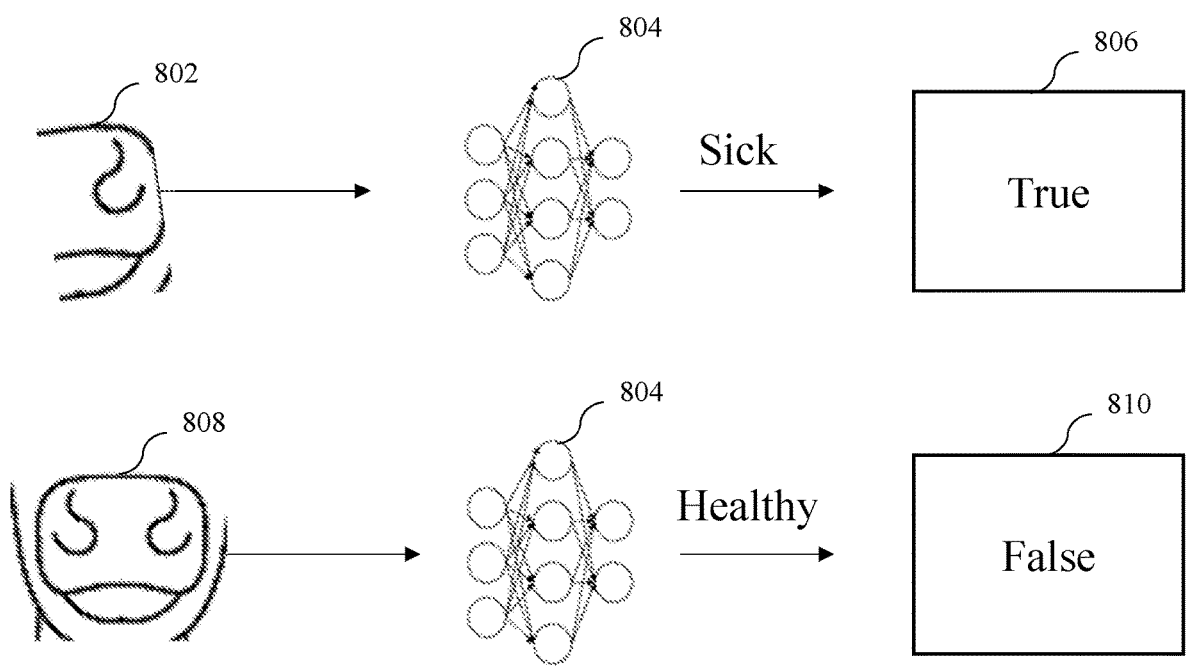
FIG. 8 is a schematic exemplary representation of disease detection using image of muzzle, in accordance with an embodiment of the present disclosure.

FIG. 8 is a schematic exemplary representation of disease detection using image of muzzle, in accordance with an embodiment of the present disclosure. FIG. 8 schematically represents two scenarios for identification of the one or more animals. In the first scenario, one or more muzzle features corresponding to cow's muzzle is extracted from a first image 802 of the cow's muzzle. Further, one or more muzzle changes in the extracted one or more muzzle features are determined by comparing the extracted one or more muzzle features with prestored muzzle features corresponding to the cow's muzzle by using the trained disease management-based ML model. Furthermore, the cow is classified as healthy or sick based on the determined one or more muzzle changes and the prestored information by using a disease classifier network 804 i.e., the trained disease management-based ML model. The trained disease management-based ML model provides true 806 output for sick. Thus, the cow is sick. Similarly, in the second scenario, one or more muzzle features corresponding to the cow's muzzle is extracted from a second image 808 of the cow's muzzle. Further, one or more muzzle changes in the extracted one or more muzzle features are determined by comparing the extracted one or more muzzle features with prestored muzzle features corresponding to the cow's muzzle by using the trained disease management-based ML model. Furthermore, the cow is classified as healthy or sick based on the determined one or more muzzle changes and the prestored information by using the disease classifier network 804 i.e., the trained disease management-based ML model. The trained disease management-based ML model provides false 810 output for sick. Thus, the cow is sick.

Figure 9:
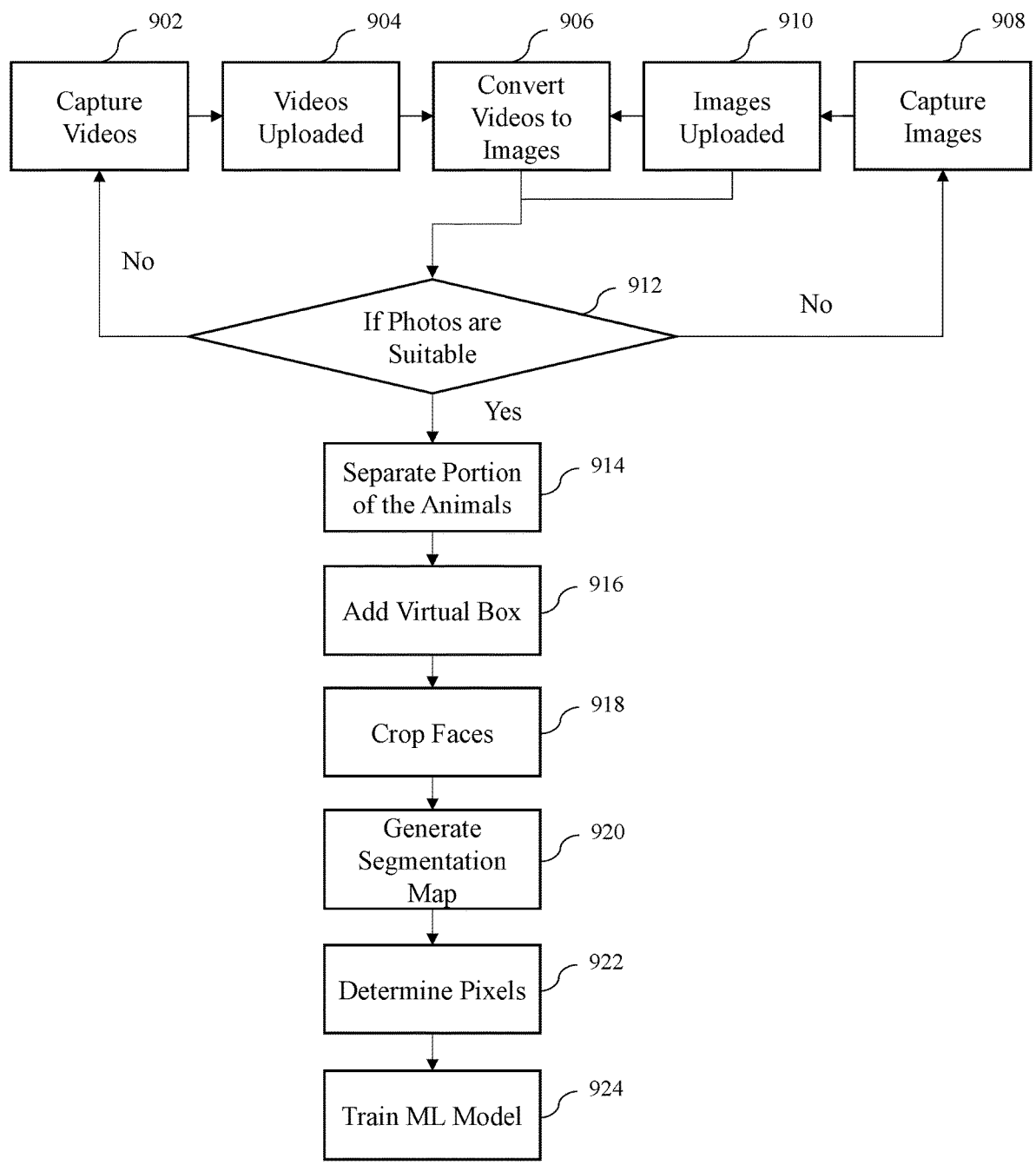
FIG. 9 is an exemplary flow chart illustrating training of disease management-based ML model to identify one or more faces of the one or more animals in one or more images and one or more videos, in accordance with an embodiment of the present disclosure.

FIG. 9 is a flow chart exemplary illustrating training of disease management-based ML model to identify one or more faces of the one or more animals in one or more images and one or more videos, in accordance with an embodiment of the present disclosure. At step 902, the one or more videos of the one or more animals are captured by the one or more image capturing devices 102, the one or more user devices 108 or a combination thereof. At step 904, the captured one or more videos are uploaded to the computing system 104. Further, at step 906, the one or more videos are converted into the one or more images. In an embodiment of the present disclosure, the one or more images may also be captured simultaneous to the capturing of the one or more videos. At step 908, the one or more images of the one or more animals are captured by the one or more image capturing devices 102, the one or more user devices 108 or a combination thereof. Furthermore, at step 910, the captured one or more images are uploaded to the computing system 104. At step 912, it is determined if the one or more images, the one or more converted images or a combination thereof depict entire muzzle, entire face of each of the one or more animals or a combination thereof. When the one or more images, the one or more converted images or a combination thereof do not depict the entire muzzle, the entire face of each of the one or more animals or a combination thereof, the one or more images, the one or more videos or a combination thereof are re-captured. At step 914, portion of the one or more animals in the one or more images, the converted one or more images or a combination thereof is separated from rest of the one or more images, the converted one or more images or a combination thereof by using the image segmentation technique. In an alternate embodiment of the present disclosure, at step 914, portion of the one or more animals in the received multimedia including the captured one or more images, the captured one or more videos or a combination thereof is separated from rest of the received multimedia by using the image segmentation technique. At step 916, a virtual box is added in the one or more images, the converted one or more images or a combination thereof around each of the one or more faces of the one or more animals upon separating portion of the one or more animals. In an alternate embodiment of the present disclosure, at step 916, the virtual box is added in the received multimedia around each of the one or more faces of the one or more animals upon separating portion of the one or more animals. At step 918, one or more faces of the one or more animals are cropped from the one or more images, the converted one or more images or a combination thereof upon adding the virtual box. In an alternate embodiment of the present disclosure, at step 918, the one or more faces of the one or more animals are cropped from the received multimedia upon adding the virtual box. At step 920, a segmentation map is generated corresponding to the cropped one or more faces of the one or more animals by using the image segmentation technique. The segmentation map include muzzle map and the facial map. At step 922, a set of pixels corresponding to the one or more faces of the one or more animals are determined based on the generated segmentation map. At step 924, the disease management-based ML model is trained based on the determined set of pixels to identify the one or more faces of the one or more animals in one or more images, the one or more videos or a combination thereof.

Figure 10:
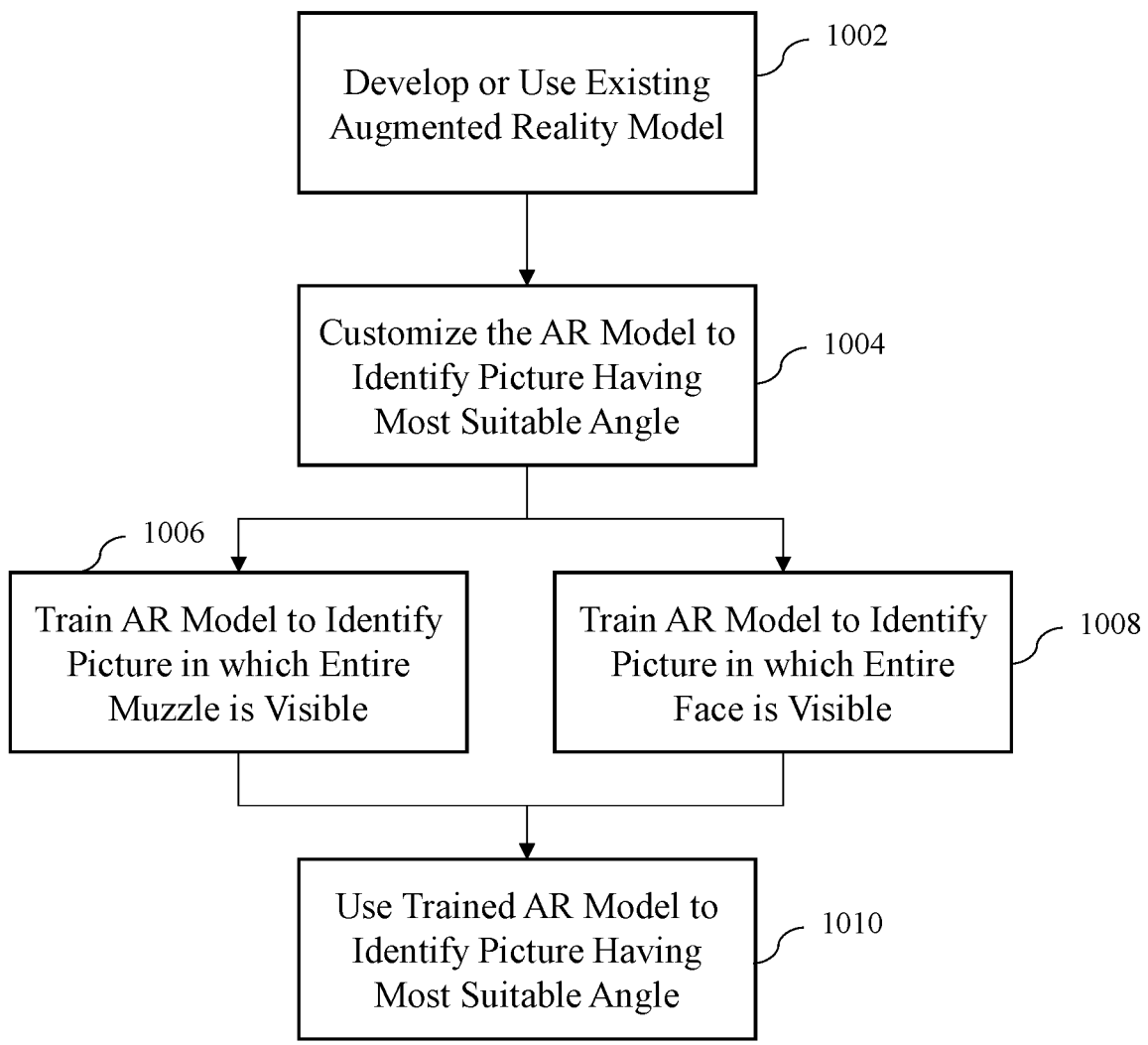
FIG. 10 is an exemplary flow chart illustrating training of picture identification model, in accordance with an embodiment of the present disclosure.

FIG. 10 is a flow chart exemplary illustrating training of picture identification model, in accordance with an embodiment of the present disclosure. In an embodiment of the present disclosure, the picture identification model is based on Augmented Reality (AR), virtual reality (VR), digital art such as metaverse and the like. At step 1002, picture identification model used for identifying most suitable picture from the one or more images, the converted one or more images or a combination thereof may be existing model or newly developed model. At step 1004, the picture identification model is customized to identify picture having most suitable angle. In customizing the picture identification model to identify the picture having most suitable angle, at step 1006, the picture identification model is trained to identify a picture in which entire muzzle of the one or more animals is visible. Further, at step 1008, the picture identification AR model is trained to identify a picture in which entire face of the one or more animals is visible. At step 1010, the trained picture identification model is used to identify the picture having most suitable angle.

Thus, various embodiments of the present computing system 104 provide for animal disease management. Since, the computing system 104 detects presence or absence of the one or more diseases, predicts likelihood of the one or more diseases in the one or more animals or a combination thereof, the one or more diseases may be treated in early stages resulting in least treatment expenses. Further, the one or more animals having the one or more diseases may be separated from healthy animals to prevent disease outbreak. Since, the computing system 104 predicts likelihood of the one or more diseases in the one or more animals, one or more animal products of the one or more animals are not supplied to the consumers. Thus, the computing system 104 promotes safety of the consumers.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W) and DVD.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus 208 to various devices such as a random-access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

A description of an embodiment with several components in communication with each other does not imply that all such components are required. On the contrary, a variety of optional components are described to illustrate the wide variety of possible embodiments of the invention. When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

We claim:

1. A computing system for animal disease management, the computing system comprising:
one or more hardware processors; and
a memory coupled to the one or more hardware processors, wherein the memory comprises a plurality of modules in the form of programmable instructions executable by the one or more hardware processors, wherein the plurality of modules comprises:
a data receiver module configured to receive at least of: one or more images and one or more videos of one or more animals from at least one of: one or more image capturing devices and one or more user devices, wherein the one or more animals comprise at least one or combination of: wildlife, livestock and domesticated animals;
a face identification module configured to identify one or more faces of the one or more animals in the received at least of: one or more images and one or more videos by using a trained disease management-based Machine Learning (ML) model and an image segmentation technique, wherein the trained disease management-based ML model is at least one of: ML model, and Artificial Intelligence (AI) model, wherein the face identification module is configured to:
separate a portion corresponding to the one or more animals in a received multimedia from rest of the received multimedia by using the image segmentation technique, wherein the received multimedia comprise at least one of: the received one or more images and the received one or more videos;
add a virtual box in the received multimedia around each of the one or more faces of the one or more animals upon separating portion corresponding to the one or more animals;
crop the one or more faces of the one or more animals from the received multimedia upon adding the virtual box, wherein the cropping of the one or more faces of the one or more animals is performed virtually;
generate a segmentation map corresponding to the cropped one or more faces of the one or more animals by using the image segmentation technique, wherein the segmentation map comprises: muzzle map and the facial map and wherein the segmentation map is a virtual map; and
determine a set of pixels corresponding to the one or more faces of the one or more animals based on the generated segmentation map by using the trained disease management-based ML model;
a data extraction module configured to extract at least one of: one or more facial features and one or more muzzle features from the identified one or more faces of the one or more animals by using the trained disease management-based ML model;
a data determination module configured to determine at least one of: one or more facial changes and one or more muzzle changes in the extracted at least one of: the one or more facial features and the one or more muzzle features associated with the one or more animals by comparing the extracted at least one of: the one or more facial features and the one or more muzzle features with prestored facial features and prestored muzzle features corresponding to the one or more animals by using the trained disease management-based ML model; and
a data management module configured to perform at least one of:
detecting one of: presence and absence of one or more diseases in the one or more animals based on the determined at least one of: the one or more facial changes and the one or more muzzle changes and predefined information by using the trained disease management-based ML model; and
predicting likelihood of the one or more diseases in the one or more animals based on the determined at least one of: the one or more facial changes and the one or more muzzle changes and the predefined information by using the trained disease management-based ML model.

2. The computing system of claim 1, further comprises a data output module configured to output the detected one of: presence and absence of the one or more diseases and the predicted likelihood of the one or more diseases to the one or more user devices associated with a user.

3. The computing system of claim 1, further comprises a model training module configured to train the disease management-based ML model based on the at least of: one or more images and/or one or more videos of the one or more animals, the extracted one or more facial features, the extracted one or more muzzle features and the set of pixels.

4. The computing system of claim 3, wherein in training the disease management-based ML model based on the at least of: one or more images and one or more videos of the one or more animals, the extracted one or more facial features, the extracted one or more muzzle features and the set of pixels, the model training module is configured to:
train the disease management-based ML model based on the at least of: one or more images and one or more videos of the one or more animals to identify the one or more animals; and
train the disease management-based ML model based on the at least one of: the one or more facial features and the one or more muzzle features and the set of pixels corresponding to the at least one of: the one or more facial features and the one or more muzzle features of the one or more animals, wherein the disease management-based ML model is trained based on the at least one of: the one or more facial features and the one or more muzzle features of the one or more animals extracted at multiple growth stage of the one or more animals to determine changes in the one or more faces of the one or more animals over time, wherein the trained disease management-based ML model represents one or more characteristics assigned to each of the at least one of: the one or more facial features and the one or more muzzle features of the one or more animals, wherein the one or more characteristics comprise: one or more physiological change parameters associated with the at least one of: the one or more facial features and the one or more muzzle features and wherein each of the one or more physiological change represents a disease.

5. The computing system of claim 4, wherein in performing the at least one of: detecting one of: presence and absence of the one or more diseases in the one or more animals based on the determined at least one of: the one or more facial changes and the one or more muzzle changes and the predefined information by using the trained disease management-based ML model and predicting the likelihood of the one or more diseases in the one or more animals based on the determined at least one of: the one or more facial changes and the one or more muzzle changes and the predefined information by using the trained disease management-based ML model, the data management module is configured to:
  correlate the determined at least one of: the one or more facial changes and the one or more muzzle changes and the one or more physiological change parameters by using the trained disease management-based ML model;
  detect one of: presence and absence of the one or more diseases in the one or more animals based on the result of correlation; and
  predict likelihood of the one or more diseases in the one or more animals based on the result of correlation.

6. The computing system of claim 3, further comprises a picture identification module configured to identify at least one picture from the received multimedia having most suitable angle by using a trained picture identification model, wherein the trained picture identification model is based on at least one of: Virtual Reality (VR), Augmented Reality (AR), digital art and live field testing and wherein the identified at least one picture depicts at least one of: entire muzzle and entire face of each of the one or more animals.

7. The computing system of claim 1, wherein in determining the at least one of: the one or more facial changes and the one or more muzzle changes in the extracted at least one of: the one or more facial features and the one or more muzzle features associated with the one or more animals by comparing the extracted at least one of: the one or more facial features and the one or more muzzle features with the prestored facial features and the prestored muzzle features corresponding to the one or more animals by using the trained disease management-based ML model, the data determination module is configured to:
  map the extracted at least one of: the one or more facial features and the one or more muzzle features of the one or more animals with the prestored facial features and the prestored muzzle features;
  identify the one or more animals based on the result of mapping;
  fetch the prestored facial features and the prestored muzzle features corresponding to each of the identified one or more animals; and
  determine the at least one of: the one or more facial changes and the one or more muzzle changes in the extracted at least one of: the one or more facial features and the one or more muzzle features of each of the identified one or more animals by comparing the extracted at least one of: the one or more facial features and the one or more muzzle features of each of the identified one or more animals with the fetched prestored facial features and the fetched prestored muzzle features.

8. The computing system of claim 1, wherein the one or more facial features comprise: eyes, ears, nose, horns, mouth, location of the ears, distance between the ears and distance between the eyes of the one or more animals, wherein the one or more muzzle changes comprise: muzzle, shape of the muzzle, size of the muzzle and color of the muzzle.

9. The computing system of claim 1, wherein the one or more images and the one or more videos are in at least one of: visual-light format and infrared spectrum format.

10. A method for animal disease management, the method comprising:
  receiving, by one or more hardware processors, at least of: one or more images and one or more videos of one or more animals from at least one of: one or more image capturing devices and one or more user devices, wherein the one or more animals comprise at least one or combination of: wildlife, livestock and domesticated animals;
  identifying, by the one or more hardware processors, one or more faces of the one or more animals in the received at least of: one or more images and one or more videos by using a trained disease management-based Machine Learning (ML) model and an image segmentation technique, wherein the trained disease management-based ML model is at least one of: ML model, and Artificial Intelligence (AI) model, wherein identifying the one or more faces of the one or more animals comprises:
    separating a portion corresponding to the one or more animals in a received multimedia from rest of the multimedia by using the image segmentation technique, wherein the received multimedia comprise at least one of: the received one or more images and the received one or more videos;
    adding a virtual box in the received multimedia around each of the one or more faces of the one or more animals upon separating portion corresponding to the one or more animals;
    cropping the one or more faces of the one or more animals from the received multimedia upon adding the virtual box, wherein the cropping of the one or more faces of the one or more animals is performed virtually;
    generating a segmentation map corresponding to the cropped one or more faces of the one or more animals by using the image segmentation technique, wherein the segmentation map comprises: muzzle map and the facial map and wherein the segmentation map is a virtual map; and
    determining a set of pixels corresponding to the one or more faces of the one or more animals based on the generated segmentation map by using the trained disease management-based ML model;
  extracting, by the one or more hardware processors, at least one of: one or more facial features and one or more muzzle features from the identified one or more faces of the one or more animals by using the trained disease management-based ML model;
  determining, by the one or more hardware processors, at least one of: one or more facial changes and one or more muzzle changes in the extracted at least one of: the one or more facial features and the one or more muzzle features associated with the one or more animals by comparing the extracted at least one of: the one or more facial features and the one or more muzzle features with prestored facial features corresponding to the one or more animals by using the trained disease management-based ML model; and
  performing, by the one or more hardware processors, at least one of:
  detecting one of: presence and absence of one or more diseases in the one or more animals based on the determined at least one of: the one or more facial changes and the one or more muzzle changes and predefined information by using the trained disease management-based ML model; and
  predicting likelihood of the one or more diseases in the one or more animals based on the determined at least one of: the one or more facial changes and the one or more muzzle changes and the predefined information by using the trained disease management-based ML model.

11. The method of claim 10, further comprises outputting the detected one of: presence and absence of the one or more diseases and the predicted likelihood of the one or more diseases to the one or more user devices associated with a user.

12. The method of claim 1, further comprises training the disease management-based ML model based on the at least of: one or more images and one or more videos of the one or more animals, the extracted one or more facial features, the extracted one or more muzzle features and the set of pixels.

13. The method of claim 12, wherein training the disease management-based ML model based on the at least of: one or more images and one or more videos of the one or more animals, the extracted one or more facial features, the extracted one or more muzzle features and the set of pixels comprises:
   train the disease management-based ML model based on the at least of: one or more images and one or more videos of the one or more animals to identify the one or more animals; and
   train the disease management-based ML model based on the at least one of: the one or more facial features and the one or more muzzle features and the set of pixels corresponding to the at least one of: the one or more facial features and the one or more muzzle features of the one or more animals, wherein the disease management-based ML model is trained based on the at least one: the one or more facial features and the one or more muzzle features of the one or more animals extracted at multiple growth stage of the one or more animals to determine changes in the one or more faces of the one or more animals over time, wherein the trained disease management-based ML model represents one or more characteristics assigned to each of the at least one of: one or more facial features and the one or more muzzle features of the one or more animals, wherein the one or more characteristics comprise: one or more physiological change parameters associated with the at least one of: the one or more facial features and the one or more muzzle features and wherein each of the one or more physiological change represents a disease.

14. The method of claim 13, wherein performing the at least one of: detecting one of: presence and absence of the one or more diseases in the one or more animals based on the determined at least one of: the one or more facial changes and the one or more muzzle changes and the predefined information by using the trained disease management-based ML model and predicting the likelihood of the one or more diseases in the one or more animals based on the determined at least one of: the one or more facial changes and the one or more muzzle changes and the predefined information by using the trained disease management-based ML model comprises:
   correlating the determined at least one of: the one or more facial changes and the one or more muzzle changes and the one or more physiological change parameters by using the trained disease management-based ML model;
   detecting one of: presence and absence of the one or more diseases in the one or more animals based on the result of correlation; and
   predicting likelihood of the one or more diseases in the one or more animals based on the result of correlation.

15. The method of claim 12, further comprises identifying at least one picture from the received multimedia having most suitable angle by using a trained picture identification model, wherein the trained picture identification model is based on at least one of: Virtual Reality (VR), Augmented Reality (AR), digital art and live field testing and wherein the identified at least one picture depicts at least one of: entire muzzle and entire face of each of the one or more animals.

16. The method of claim 10, wherein determining the at least one of: one or more facial changes and the one or more muzzle changes in the extracted at least one of: the one or more facial features and the one or more muzzle features associated with the one or more animals by comparing the extracted at least one of: the one or more facial features and the one or more muzzle features with the prestored facial features and the prestored muzzle features corresponding to the one or more animals by using the trained disease management-based ML model comprises:
   mapping the extracted at least one of: the one or more facial features and the one or more muzzle features of the one or more animals with the prestored facial features and the prestored muzzle features;
   identifying the one or more animals based on the result of mapping;
   fetching the prestored facial features and the prestored muzzle features corresponding to each of the identified one or more animals; and
   determining the at least one: the one or more facial changes and the one or more muzzle changes in the extracted at least one of: the one or more facial features and the one or more muzzle features of each of the identified one or more animals by comparing the extracted at least one of: the one or more facial features and the one or more muzzle features of each of the identified one or more animals with the fetched prestored facial features and the prestored muzzle features.

17. The method of claim 10, wherein the one or more facial features comprise: eyes, ears, nose, horns, mouth, location of the ears, distance between the ears and distance between the eyes of the one or more animals, wherein the one or more muzzle changes comprise: muzzle, shape of the muzzle, size of the muzzle and color of the muzzle.

18. The method of claim 10, wherein the one or more images and the one or more videos are in at least one of: visual-light format and infrared spectrum format.

* * * * *